(12) United States Patent
Maehata

(10) Patent No.: US 8,879,614 B2
(45) Date of Patent: Nov. 4, 2014

(54) OVERPOWER DETECTION DEVICE AND RADIO COMMUNICATION DEVICE

(75) Inventor: Takashi Maehata, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/997,688

(22) PCT Filed: Dec. 13, 2011

(86) PCT No.: PCT/JP2011/078775
§ 371 (c)(1),
(2), (4) Date: Jun. 25, 2013

(87) PCT Pub. No.: WO2012/090696
PCT Pub. Date: Jul. 5, 2012

(65) Prior Publication Data
US 2013/0287081 A1 Oct. 31, 2013

(30) Foreign Application Priority Data
Dec. 28, 2010 (JP) .................................. 2010-292596

(51) Int. Cl.
*H04B 3/46* (2006.01)
*H04B 17/00* (2006.01)
*H04Q 1/20* (2006.01)
*H04W 52/36* (2009.01)
*H04W 52/30* (2009.01)

(52) U.S. Cl.
CPC ............. *H04B 17/00* (2013.01); *H04W 52/367* (2013.01); *H04W 52/30* (2013.01)
USPC ........................ 375/224; 324/103 R; 361/91.1

(58) Field of Classification Search
USPC .................... 375/224; 324/103 R; 455/127.1; 361/91.1
See application file for complete search history.

(56) References Cited

U.S. PATENT DOCUMENTS

| | | | |
|---|---|---|---|
| 5,659,582 | A | 8/1997 | Kojima et al. |
| 7,656,148 | B1* | 2/2010 | Li ............................ 324/103 R |
| 2006/0227476 | A1* | 10/2006 | Yang ............................. 361/90 |

FOREIGN PATENT DOCUMENTS

| | | |
|---|---|---|
| CN | 1123491 A | 5/1996 |
| JP | 2001-077791 A | 3/2001 |
| JP | 2002-176411 A | 6/2002 |
| JP | 2006-186736 A | 7/2006 |
| JP | 2010-109630 A | 5/2010 |
| WO | WO-01/99316 A1 | 12/2001 |

OTHER PUBLICATIONS

"Waveform Data Processing for Scientific Instrumentation," CQ Publishing Co., Ltd., Shigeo Minami, pp. 86-103, Published Apr. 1986 with attached partial English-language translation.

* cited by examiner

*Primary Examiner* — Curtis Odom
(74) *Attorney, Agent, or Firm* — Drinker Biddle & Reath LLP

(57) ABSTRACT

The present invention relates to an overpower detection device 51 capable of detecting, with a simple configuration, overpower of a circuit that processes a signal associated with instantaneous variation. The overpower detection device 51 of the present invention includes: a power information acquisition section 61 for acquiring an index value of power, at each timing, of a signal transmitted or received in a target device; a comparison section 62 for comparing the index value acquired by the power information acquisition section 61 with an evaluation threshold; a comparison result accumulation section 63 for accumulating a value indicating a comparison result of the comparison section 62 at the each timing; and an overpower determination section 64 for determining overpower of a circuit in the target device, based on an accumulation result of the comparison result accumulation section 63.

8 Claims, 8 Drawing Sheets

FIG. 6

| PTh | CASE A | CASE B |
|---|---|---|
| 5100 | 3000 | 3000 |
| 5200 | 1500 | 3000 |
| 5300 | 100 | 3000 |
| 5400 | 10 | 2500 |
| 5500 | 0 | 2000 |

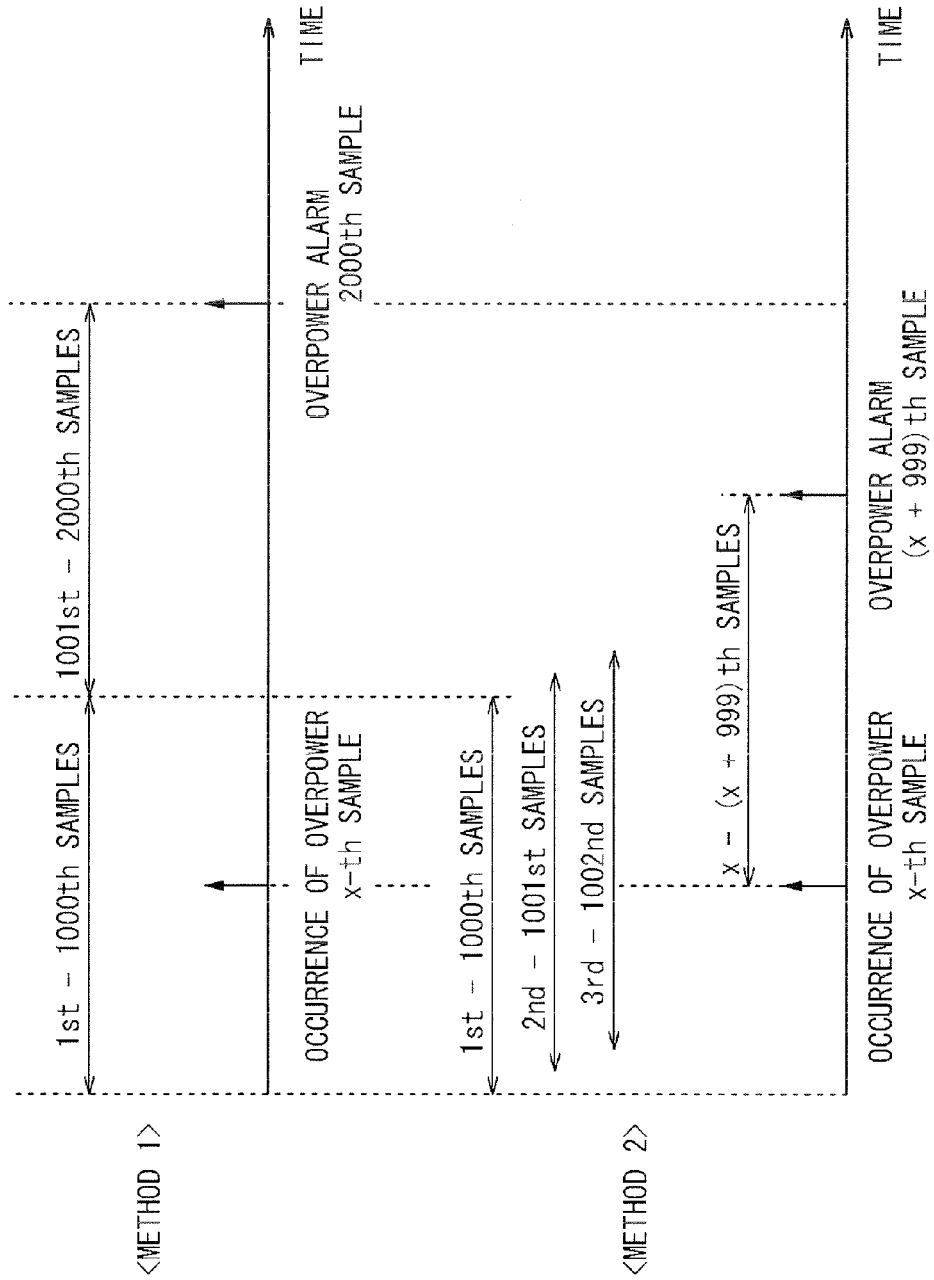

OVERPOWER DETECTION DEVICE AND RADIO COMMUNICATION DEVICE

TECHNICAL FIELD

The present invention relates to an overpower detection device and a radio communication device, and more particularly, to an overpower detection device and a radio communication device which detect overpower of a circuit in a target device.

BACKGROUND ART

In order to perform high-speed communication, a wideband signal is inevitably required. In complying with such a request, communication schemes such as W-CDMA (Wide Band Code Division Multiple Access) and OFDM (Quadrature Frequency Division Multiplex) have been developed.

In radio communication devices adopting these communication schemes, detection of over output power of an amplifier or the like is sometimes performed. The purpose of the over-output detection is, for example, to cope with legal regulations, or to prevent damage due to thermal stress inside the devices.

In a configuration for amplifying a wide-band signal, the signal to be amplified is a signal associated with instantaneous variation. Therefore, when operating an amplifier the output power of which is defined, it is necessary to measure the average power of the amplifier. In addition, also when checking whether or not the output power from the amplifier is proper, it is necessary to measure not the instantaneous power but the average power.

The wide-band signal treated in the above-mentioned communication schemes is characterized in having a high peak-to-average power ratio. Therefore, in order to perform measurement of the average power, detection of over output power, and the like, some calculation function is required.

That is, in order to measure the power of the wide-band signal, the instantaneous power variation needs to be averaged. For example, it is known that, in OFDM, the PAPR (Peak to Average Power Ratio) is about 10 dB. Therefore, the average power cannot be determined depending on whether or not the instantaneous power exceeds the defined power.

As an example of a method for measuring the average power, "Waveform Data Processing for Scientific Instrumentation", CQ Publishing Co., Ltd., Shigeo Minami, pp. 86-97, Published in April, 1986 (Non-Patent Literature 1) discloses, in formula (5-15), a moving average calculation algorithm based on a recursive method using an average of multiple samples.

CITATION LIST

Non Patent Literature

[NPL 1] "Waveform Data Processing for Scientific Instrumentation", CQ Publishing Co., Ltd., Shigeo Minami, pp. 86-97, Published in April, 1986

SUMMARY OF THE INVENTION

Problems to be Solved by the Invention

However, if the algorithm disclose in Non-Patent Literature 1 is implemented as a circuit in order to calculate the average power, at least a plurality of flip-flops and an adder are needed, which causes an increase in the circuit scale.

The present invention has been made to solve the above-mentioned problems, and an object of the present invention is to provide an overpower detection device and a radio communication device which can detect, with a simple configuration, overpower of a circuit for processing a signal associated with an instantaneous variation.

Solution to the Problems (1) To achieve the above objects, an overpower detection device according to an aspect of the present invention includes: a power information acquisition section for acquiring an index value of power, at each timing, of a signal transmitted or received in a target device; a comparison section for comparing the index value acquired by the power information acquisition section with an evaluation threshold; a comparison result accumulation section for accumulating a value indicating a comparison result of the comparison section at the each timing; and an overpower determination section for determining overpower of a circuit in the target device, based on an accumulation result of the comparison result accumulation section.

According to this configuration, an average power of a signal associated with instantaneous variation can be obtained with the simple configuration. That is, overpower of a circuit that processes a signal associated with instantaneous variation can be detected with a simple configuration including, for example, a comparator and an up/down counter, without using a large number of flip-flops, memories, and the like. When the amplitude of an I signal is I and the amplitude of a Q signal is Q in quadrature modulation, the index value is represented by $\sqrt{(I^2+Q^2)}$, or $(I^2+Q^2)$, or $(I^2+Q^2)^n$.

(2) Preferably, the comparison result accumulation section adds a positive or negative first control value to the most recent accumulation result in a case where the index value is larger than the evaluation threshold, and adds a second control value with a sign opposite to that of the first control value to the most recent accumulation result in a case where the index value is smaller than the evaluation threshold.

As described above, the first control value and the second control value are not set to 0, and the signs of the first control value and the second control value are made opposite to each other. Thereby, when the power of the target signal is a normal value, the accumulation result of the comparison result accumulation section, for example, the count value of the up/down counter, can be caused to converge to a certain value. Therefore, a moving average of the power of the target signal can be obtained. That is, it becomes possible to detect overpower at the time when the minimum number of samples have been obtained after the power of the target signal exceeded a predetermined threshold. Further, since the moving average can be obtained, it is possible to reduce the possibility of omission of overpower when the overpower period is short, as compared to the configuration in which the average power is calculated for each predetermined time period. Further, it is possible to avoid the situation that the count value of the up/down counter is increased little by little due to an influence of noise or the like and thereby an overpower alarm is output erroneously. In addition, it is unnecessary to reset the count value of the up/down counter periodically or under a predetermined condition in order to avoid such erroneous detection, and thus the configuration can be simplified.

(3) More preferably, the absolute value of the first control value and the absolute value of the second control value are equal to each other.

According to this configuration, the earliness of overpower detection and the probability of erroneous detection can be successfully balanced.

(4) More preferably, the absolute value of the first control value and the absolute value of the second control value are 1.

According to this configuration, the comparison result accumulation section can be implemented by a simple circuit that adds and subtracts 1, for example, an up/down counter.

(5) Preferably, the comparison result accumulation section includes an up/down counter that performs count-up or count-down based on the magnitude correlation between the index value and the evaluation threshold.

According to this configuration, the comparison result accumulation section can be implemented by a versatile circuit, and thus the configuration can be simplified.

(6) More preferably, the evaluation threshold is set to a value at which the count value of the up/down counter converges in a case where the power of the signal has a value that causes no overpower, and the count value of the up/down counter increases or decreases from the convergence value in a case where the power of the signal has a value that causes overpower.

According to this configuration, a moving average of the power of the target signal can be obtained with the simple configuration. Further, in a case where the comparison result accumulation section is, for example, an up/down counter, the count value of the up/down counter converges to a certain value, for example, 0 when the power of the target signal is the normal value. Therefore, it is not necessary to reset the count value, and thus the configuration can be simplified.

(7) Preferably, the overpower determination section compares the accumulation result with an accumulation result threshold, and determines overpower based on the magnitude correlation between the accumulation result and the accumulation result threshold.

According to this configuration, determination of overpower can be performed with the simple configuration using the threshold.

(8) To achieve the above objects, a radio communication device according to an aspect of the present invention includes: an amplifier for amplifying a radio signal to be transmitted or a radio signal received; and an overpower detection section for detecting overpower of the amplifier. The overpower detection section comprises: a power information acquisition section for acquiring an index value of power, at each timing, of the signal before amplified by the amplifier or the signal after amplified by the amplifier; a comparison section for comparing the index value acquired by the power information acquisition section with an evaluation threshold; a comparison result accumulation section for accumulating a value indicating a comparison result of the comparison section at the each timing; and an overpower determination section for determining overpower in the amplifier, based on an accumulation result of the comparison result accumulation section.

According to this configuration, an average power of a signal associated with instantaneous variation can be obtained with the simple configuration. That is, it is possible to detect overpower of a circuit that processes a signal associated with instantaneous variation, with a simple configuration including, for example, a comparator and an up/down counter, without using a large number of flip-flops, memories, and the like.

Advantageous Effects of the Invention

According to the present invention, it is possible to detect overpower of a circuit that processes a signal associated with instantaneous variation, with a simple configuration.

BRIEF DESCRIPTION OF THE DRAWINGS

FIG. 6 is a diagram showing the relationship between the evaluation threshold and up/down counter values in cases A and B, in the overpower detection section according to the embodiment of the present invention.

FIG. 8 is a diagram showing an overpower detecting of the overpower detection section according to the embodiment of the present invention.

DESCRIPTION OF EMBODIMENTS

Figure 1:
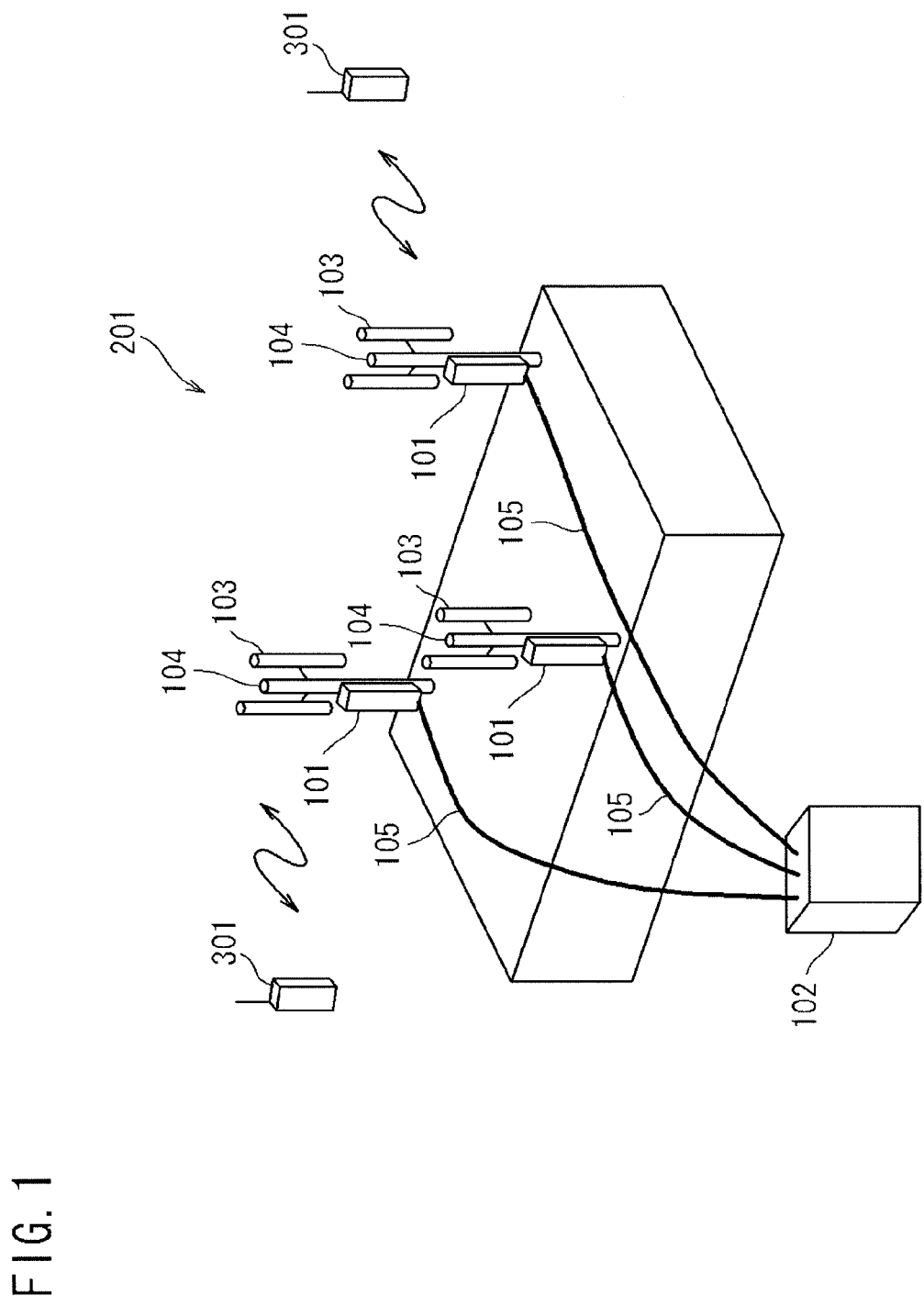
FIG. 1 is a diagram showing a configuration of a radio communication device according to an embodiment of the present invention.

Hereinafter, an embodiment of the present invention will be described with reference to the drawings. In the drawings, the same or corresponding parts are denoted by the same reference numerals, and will not be repeatedly described.

FIG. 1 is a diagram showing a configuration of a radio communication device according to an embodiment of the present invention.

With reference to FIG. 1, a radio communication device 201 includes one or a plurality of remote radio heads (RRH) 101, and a body device 102.

Each remote radio head 101 is a device obtained by separating a part that performs transmission and reception of radio signals, from a radio base station device used in mobile communication. The remote radio head 101 is attached to an antenna pole 104 installed on the roof of a building or the like. Further, an antenna 103 is attached to the antenna pole 104.

The remote radio head 101 converts a radio signal received from a radio terminal device 301 via the antenna 103 into a digital signal, and outputs the digital signal to the body device 102 via an optical fiber 105. Further, the remote radio head 101 converts a digital signal received from the body device 102 via the optical fiber 105 into a radio signal, and transmits the radio signal to the radio terminal device 301 via the antenna 103.

Figure 2:
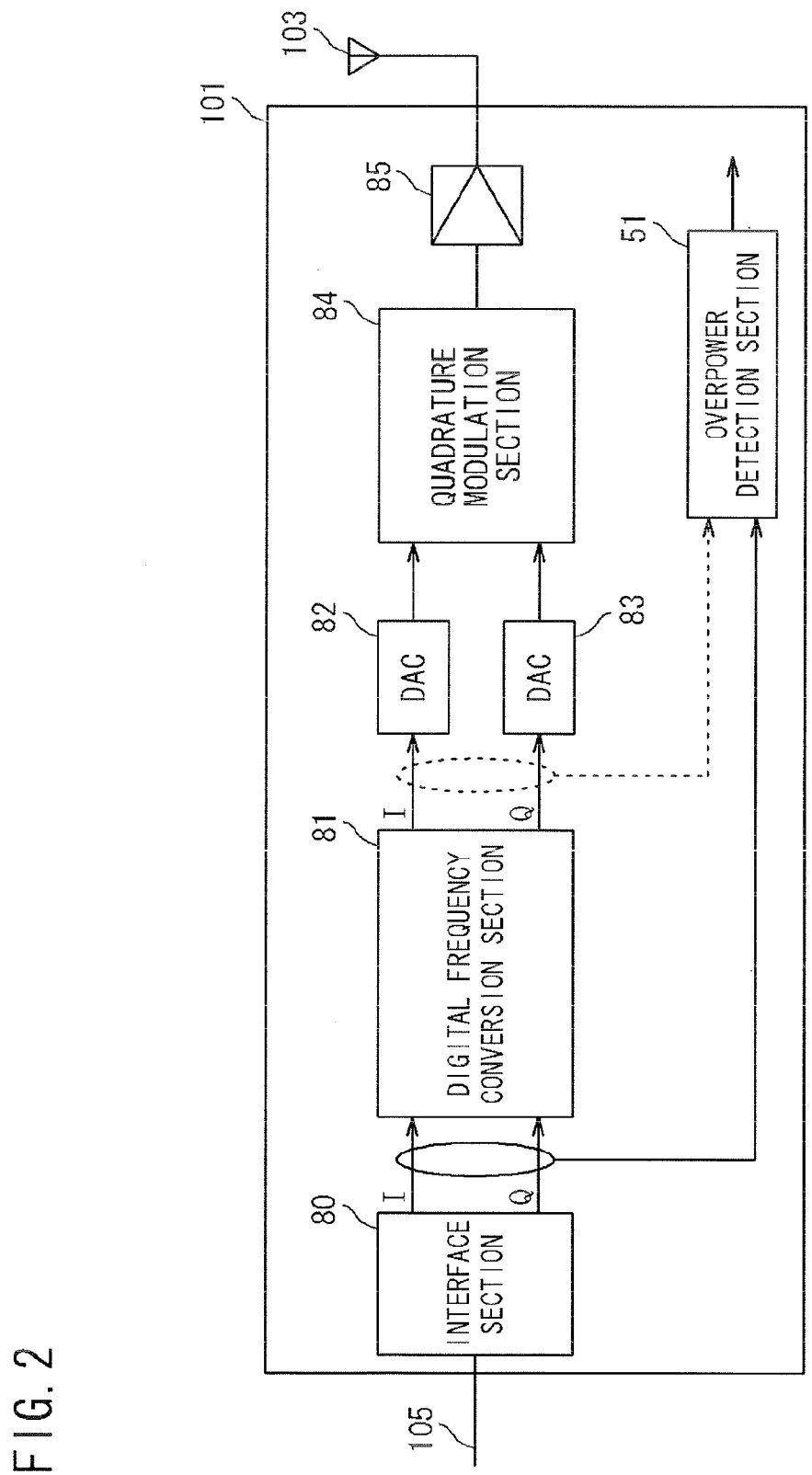
FIG. 2 is a functional block diagram showing a remote radio head according to the embodiment of the present invention.

FIG. 2 is a functional block diagram showing the remote radio head according to the embodiment of the present invention.

With reference to FIG. 2, the remote radio head 101 includes an interface section 80, a digital frequency conversion section 81, digital/analog converters (DAC) 82 and 83, a quadrature modulation section 84, a high power amplifier 85, and an overpower detection section 51.

The interface section 80 reproduces an I signal and a Q signal as electric signals from an optical signal received from the body device 102 via the optical fiber 105, and outputs the I signal and the Q signal to the digital frequency conversion section 81. The I signal and the Q signal each include amplitude information.

The digital frequency conversion section 81 frequency-converts the I signal and the Q signal in a baseband which are received from the interface section 80, into signals in an IF (Intermediate Frequency) band by performing calculation using a rotation matrix, and outputs the frequency-converted I signal and Q signal to the digital/analog converters 82 and 83, respectively.

The digital/analog converters 82 and 83 convert the I signal and the Q signal which are digital signals received from the digital frequency conversion section 81, into analog signals, and output the analog signals to the quadrature modulation section 84.

The quadrature modulation section 84 performs quadrature modulation on the I signal and the Q signal which are analog signals received from the digital/analog converters and 83, respectively, and converts the quadrature-modulated signals into signals in an RF (Radio Frequency) band, and then outputs the resultant signals to the high power amplifier 85.

The high power amplifier 85 amplifies the signals received from the quadrature modulation section 84, and outputs the amplified signals to the antenna 103.

Based on the I signal and the Q signal received from the interface section 80, the overpower detection section 51 detects an overpower in the remote radio head 101, for example, over output power of the high power amplifier 85. It is noted that, as shown by a dotted arrow, the overpower detection section 51 may be configured to detect overpower in the remote radio head 101, based on the I signal and the Q signal received from the digital frequency conversion section 81.

Figure 3:
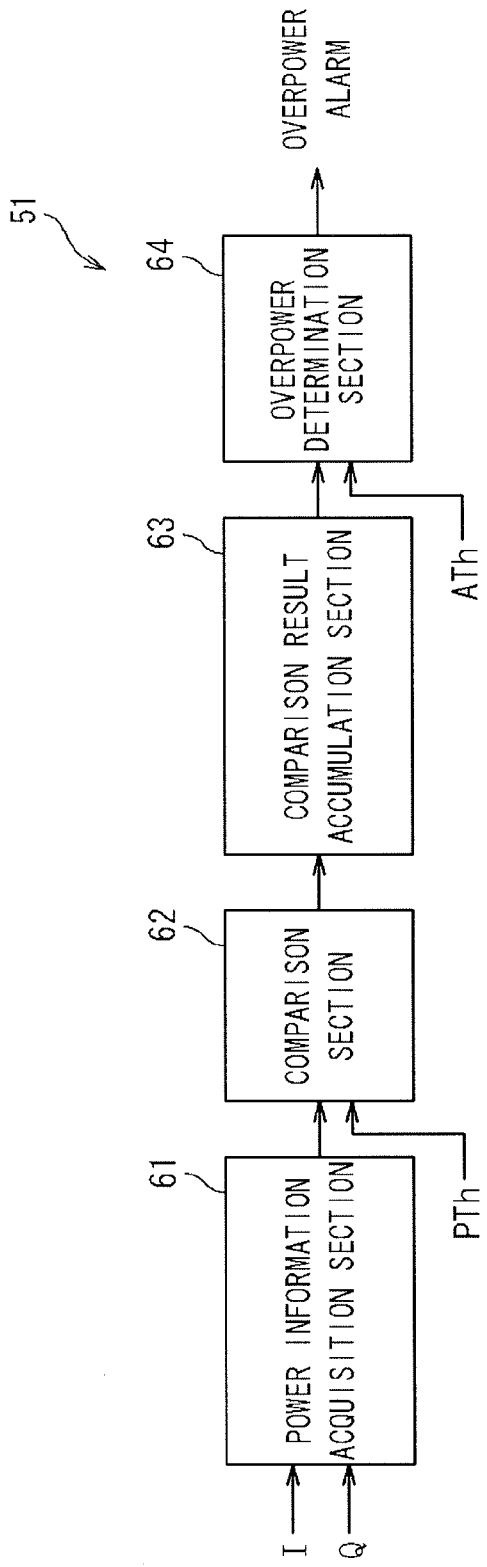
FIG. 3 is a functional block diagram showing an overpower detection section according to the embodiment of the present invention.

FIG. 3 is a functional block diagram showing the overpower detection section according to the embodiment of the present invention.

With reference to FIG. 3, the overpower detection section 51 includes a power information acquisition section 61, a comparison section 62, a comparison result accumulation section 63, and an overpower determination section 64.

The power information acquisition section 61 acquires an index value of power, at each timing, of a signal transmitted or received in a target device (hereinafter also referred to as a target signal), that is, acquires an index value of instantaneous power of the target signal. In this embodiment, the target device corresponds to the remote radio head 101, and the target signal corresponds to the I signal and the Q signal.

The comparison section 62 compares the index value acquired by the power information acquisition section 61 with an evaluation threshold PTh.

The comparison result accumulation section 63 accumulates a value indicating the comparison result of the comparison section 62 at each timing.

The overpower determination section 64 determines overpower of a circuit in the target device, based on the accumulation result of the comparison result accumulation section 63.

More specifically, the power information acquisition section 61 calculates the amplitude of the target signal, that is, the magnitude of the envelope thereof.

The comparison section 62 compares the magnitude of the envelope calculated by the power information acquisition section 61 with the evaluation threshold PTh, and outputs comparison result information to the comparison result accumulation section 63.

Based on the comparison result information received from the comparison section 62, the comparison result accumulation section 63 adds a control value α to the most recent accumulation result in a case where the magnitude of the envelope is larger than the evaluation threshold PTh, and adds a control value β to the most recent accumulation result in a case where the magnitude of the envelope is smaller than the evaluation threshold PTh. For example, the comparison result accumulation section 63 adds a positive or negative control value α to the most recent accumulation result in a case where the magnitude of the envelope is larger than the evaluation threshold PTh, and adds a control value β with a sign opposite to that of the control value a to the most recent accumulation result in a case where the magnitude of the envelope is smaller than the evaluation threshold PTh.

Specifically, the comparison result accumulation section 63 includes an up/down counter that performs count-up or count-down based on the magnitude correlation between the magnitude of the envelope as the index value and the evaluation threshold PTh. That is, this up/down counter increases or decreases the count value based on the magnitude correlation. The comparison result accumulation section 63 outputs the count value as the accumulation result.

The overpower determination section 64 compares the accumulation result received from the comparison result accumulation section 63 with an accumulation result threshold ATh, and determines overpower based on the magnitude correlation between the accumulation result and the accumulation result threshold ATh. That is, the overpower determination section 64 compares the count value that is the accumulation result received from the comparison result accumulation section 63 with the accumulation result threshold ATh, and outputs an overpower alarm in a case where the count value is larger than the accumulation result threshold ATh.

It is noted that the comparison section 62 may be configured to output the control value α and the control value β as the comparison result information to the comparison result accumulation section 63. For example, the comparison section 62 outputs +1 as the control value α to the comparison result accumulation section 63 in a case where the magnitude of the envelope is larger than the evaluation threshold PTh, and outputs −1 as the control value β to the comparison result accumulation section 63 in a case where the magnitude of the envelope is smaller than the evaluation threshold PTh. The up/down counter in the comparison result accumulation section 63 increases or decreases the count value in accordance with the value of +1 or −1 received from the comparison section 62.

Next, a description will be given of a method of determining the evaluation threshold and the accumulation result threshold in the overpower detection section according to the embodiment of the present invention.

There are cases where the high power amplifier 85 shown in FIG. 2 is thermally damaged if the state where the average power of the output signal is equal to or higher than a predetermined value continues for a predetermined time or more. Hereinafter, a case of detecting over output power of the high power amplifier 85 will be described.

In this case, the power information acquisition section 61 acquires an index value of power, at each timing, of a signal before amplified by the high power amplifier 85.

The comparison section 62 compares the index value acquired by the power information acquisition section 61 with the evaluation threshold PTh.

The comparison result accumulation section 63 accumulates a value indicating the comparison result of the comparison section 62 at each timing.

The overpower determination section 64 determines over output power of the high power amplifier 85 based on the accumulation result of the comparison result accumulation section 63.

Hereinafter, a case where the output level of the high power amplifier 85 is a normal value is referred to as case A, and a case where the output level of the high power amplifier 85 is an over output value that is, for example, 3 dB higher than the normal value is referred to as case B. The normal value is, for example, a maximum value within a defined output level range of the high power amplifier 85.

Figure 4:
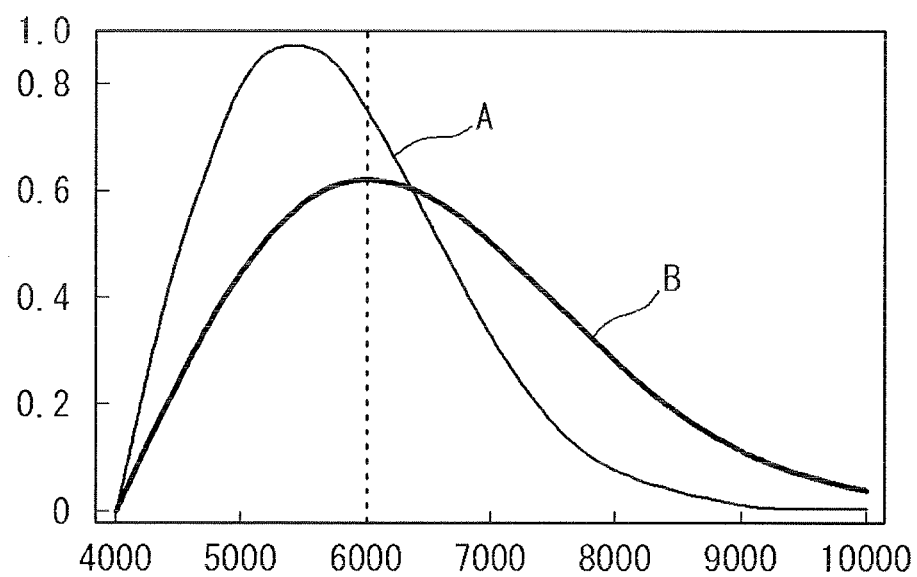
FIG. 4 is a diagram showing the relationship between the amplitudes of an I signal and a Q signal and the appearance probability thereof, in the remote radio head according to the embodiment of the present invention.

FIG. 4 is a diagram showing the relationship between the amplitudes of the I signal and the Q signal and the appearance probability thereof, in the remote radio head according to the embodiment of the present invention.

With reference to FIG. 4, the horizontal axis indicates the magnitude of the envelope, that is, the square root of the sum of the squares of the amplitudes of the I signal and the Q signal. In a case where the amplitude of the I signal is I and the amplitude of the Q signal is Q, the magnitude of the envelope is represented by a numerical formula, Sqrt (I^2+Q^2), i.e., $\sqrt{(I^2+Q^2)}$. The vertical axis indicates the appearance probability. In addition, graph A corresponds to case A, and graph B corresponds to case B.

Assuming that the I signal and the Q signal used in the radio communication device 201 are signals represented by a normal distribution, the magnitude of the envelope has a Rayleigh distribution as shown in FIG. 4.

In each graph shown in FIG. 4, the magnitude of the envelope at the vertex of graph A corresponding to case A where the average power is small is about 5400, and the magnitude of the envelope at the vertex of graph B corresponding to case B where the average power is large is about 6000.

In determining the evaluation threshold and the accumulation result threshold, firstly, the evaluation threshold PTh is changed in steps, and the values of the up/down counter in case A and case B are recorded at each evaluation threshold PTh.

Figure 5:
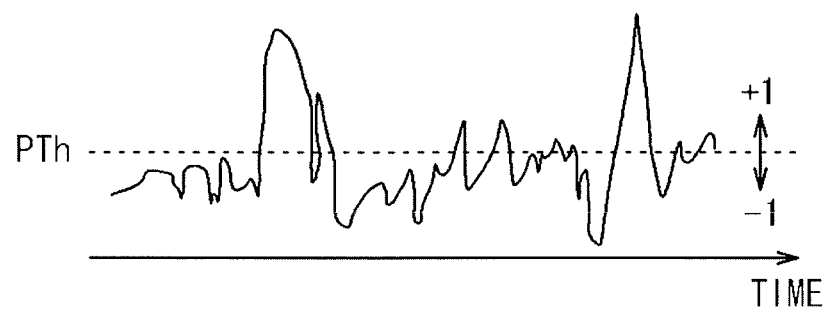
FIG. 5 is a diagram showing the relationship between the magnitude of an envelope and an evaluation threshold, in the overpower detection section according to the embodiment of the present invention.

FIG. 5 is a diagram showing the relationship between the magnitude of the envelope and the evaluation threshold, in the overpower detection section according to the embodiment of the present invention.

With reference to FIG. 5, since the magnitude of the envelope indicates the instantaneous levels of the I signal and the Q signal, if the evaluation threshold PTh as shown in FIG. 5 is set, the waveform varies across the evaluation threshold PTh.

In a case where the magnitude of the envelope is larger than the evaluation threshold PTh, 1 is added to the value of the up/down counter. In a case where the magnitude of the envelope is smaller than the evaluation threshold PTh, 1 is subtracted from the value of the up/down counter.

The overpower alarm is output in a case where the magnitude of the envelope exceeds the evaluation threshold PTh, and the value of the up/down counter is equal to or larger than the accumulation result threshold ATh.

The evaluation threshold PTh and the accumulation result threshold ATh are adjusted to such values that no overpower alarm is output in case A where the output level of the high power amplifier 85 is the normal value, and that an overpower alarm is output in case B where the output level of the high power amplifier 85 is the over output value.

FIG. 6 is a diagram showing the relationship between the evaluation threshold and the up/down counter values in the respective cases, in the overpower detection section according to the embodiment of the present invention.

With reference to FIG. 6, when the evaluation threshold PTh is 5100, the count value in case A is 3000, and the count value in case B is 3000. When the evaluation threshold PTh is 5200, the count value in case A is 1500, and the count value in case B is 3000. When the evaluation threshold PTh is 5300, the count value in case A is 100, and the count value in case B is 3000. When the evaluation threshold PTh is 5400, the count value in case A is 10, and the count value in case B is 2500. When the evaluation threshold PTh is 5500, the count value in case A is 0, and the count value in case B is 2000.

After the count values are recorded, in the relationship shown in FIG. 6, such an evaluation threshold PTh is selected, at which the count value of the up/down counter converges in a case where the power of the target signal is a value that causes no over output power in the high power amplifier 85, and the count value of the up/down counter increases or decreases from the convergence value in a case where the power of the target signal is a value that causes over output power in the high power amplifier 85, and at which the difference between the count values in case A and case B increases.

Further, as for the accumulation result threshold ATh, a value a little smaller than the count value in case B in the case of the selected evaluation threshold PTh is selected.

Next, the selected evaluation threshold PTh and accumulation result threshold ATh are set, and it is confirmed that an alarm is not output erroneously in case A where the output level of the high power amplifier 85 is the normal value. Further, it is confirmed that an alarm is correctly output in case B where the output level of the high power amplifier 85 is the over output value.

Figure 7:
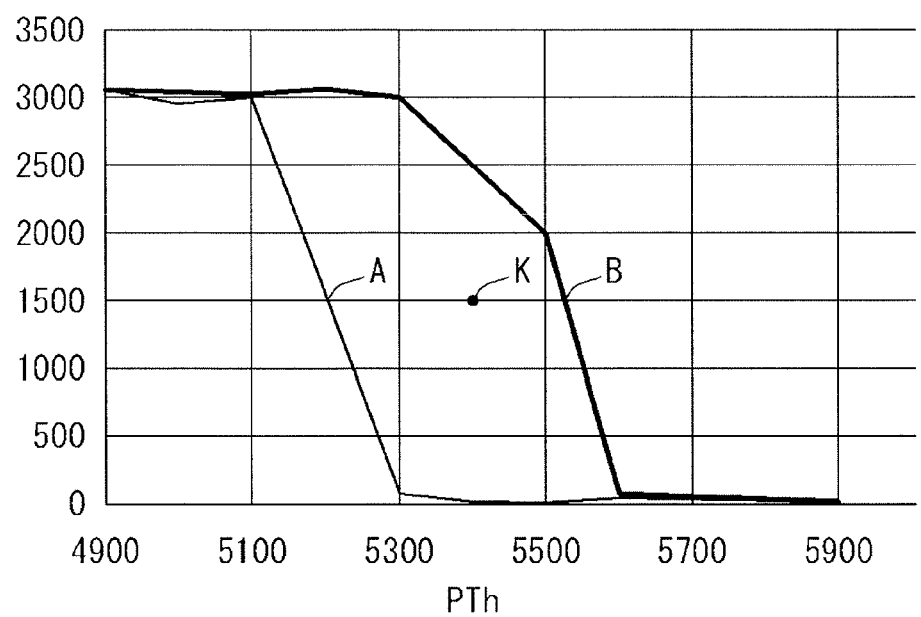
FIG. 7 is a diagram showing an experimental result of the relationship between the evaluation threshold and the up/down counter values in the respective cases, in the overpower detection section according to the embodiment of the present invention.

FIG. 7 is a diagram showing an experimental result of the relationship between the evaluation threshold and the up/down counter values in the respective cases, in the overpower detection section according to the embodiment of the present invention.

With reference to FIG. 7, in this experiment, when the evaluation threshold PTh is set to 5000, the up/down counter value is 3000 in both cases A and case B.

The reason is as follows. Since the set evaluation threshold PTh is excessively small, the magnitude of the envelope exceeds the evaluation threshold PTh in both case A and case B in the comparison section 62.

On the other hand, when the evaluation threshold PTh is set to, for example, 5400, in the comparison section 62, the magnitude of the envelope becomes smaller than the evaluation threshold PTh in case A, and the value of the up/down counter hardly increases, whereas the value of the up/down counter increases only in case B.

In order to reliably detect overpower, the accumulation result threshold ATh is set to, for example, 1500, taking into account variation in the up/down counter.

That is, the evaluation threshold PTh is decided to 5400, and the accumulation result threshold ATh is decided to 1500 (point K in FIG. 7).

FIG. 8 is a diagram showing the overpower detecting operation of the overpower detection section according to the embodiment of the present invention.

With reference to FIG. 8, since a wide-band signal is associated with instantaneous variation as described above, it is difficult to evaluate the average power of the signal by only measuring the instantaneous power.

Therefore, in the overpower detection section according to the embodiment of the present invention, for example, 1 is output from the comparison section 62 in a case where the index value of the instantaneous power of the target signal is equal to or larger than the evaluation threshold PTh, and 0 is output from the comparison section 62 in a case where the index value of the instantaneous power of the target signal is smaller than evaluation threshold PTh (method 1).

Then, 1000 samples of the output of the comparison section 62 are obtained, and a cumulative value of these samples is calculated by the comparison result accumulation section 63. This cumulative value is equal to or larger than 0 and equal to or smaller than 1000. When the cumulative value is divided by 1000, the result of the division indicates the probability that the index value of the instantaneous power of the target signal becomes equal to or larger than the evaluation threshold PTh.

This probability monotonically increases with respect to the average power of the target signal. Therefore, a probability corresponding to over output power is predetermined to be used as a threshold, and when the calculated probability exceeds the threshold, it is determined that overpower occurs. The count value corresponding to the probability threshold is the above-mentioned accumulation result threshold ATh.

That is, in the overpower detection section according to the embodiment of the present invention, the result of comparison between the feature amount of the signal, for example, the magnitude of the envelope, and the evaluation threshold PTh, is used and accumulated. Thereby, the average power can be indirectly obtained without directly calculating the average power.

However, in method 1, after overpower detection using 0th to 1000th samples is performed, overpower detection using 1001st to 2000th samples is performed. Therefore, overpower cannot be detected continuously in time, that is, continuously over the sampling time units.

For example, it is assumed that overpower occurs at x-th sampling timing, and the overpower continues. In this case, in the overpower detection using the 0th to 1000th samples, since the division result does not exceed the defined probability, the overpower cannot be detected. Then, the overpower can be detected for the first time by the overpower detection using the 1001st to 2000th samples, and thus an overpower alarm is output.

So, method 1 is improved as follows. In a case where the index value of the instantaneous power of the target signal is equal to or larger than the evaluation threshold PTh, 1 is output from the comparison section 62. In a case where the index value of the instantaneous power of the target signal is smaller than the evaluation threshold PTh, −1 is output from the comparison section 62. Then, the output of the comparison section 62 is accumulated in the comparison result accumulation section 63 by using, for example, the up/down counter (method 2).

Then, the evaluation threshold PTh is selected as described with reference to FIGS. 4 to 7, and thereby the cumulative value in the comparison result accumulation section 63 converges to a certain value when no overpower occurs. Thus, the moving average of the index value of the instantaneous power of the target signal can be obtained. That is, it becomes possible to detect overpower at the time when the minimum number of samples, for example, 1000 samples, have been obtained after the index value of the instantaneous power of the target signal exceeded the evaluation threshold PTh. Specifically, assuming that overpower occurs at the x-th sampling timing, overpower can be detected at the time when the (x+999)th sample has been obtained, and then an overpower alarm can be output.

As described above, in method 2, the cumulative value in the comparison result accumulation section 63 is compared with the accumulation result threshold ATh at each sampling timing, and thereby overpower can be detected continuously over the sampling time units.

By the way, since a wide-band signal is associated with instantaneous variation as described above, in order to evaluate the output power of an amplifier or the like, it is necessary to obtain not the instantaneous power but the average power. In the configuration disclosed in Non-Patent Literature 1, a large number of flip-flops, memories, and the like are needed in order to calculate the average value, which causes an increase in the circuit scale. For example, in order to calculate the average of 100 instantaneous power values, a large-capacity memory capable of storing therein the 100 instantaneous power values is needed.

In contrast to the above-mentioned configuration, in the overpower detection section according to the embodiment of the present invention, the power information acquisition section 61 acquires an index value of power, at each timing, of a signal transmitted or received in the target device. The comparison section 62 compares the index value acquired by the power information acquisition section 61 with the evaluation threshold PTh. The comparison result accumulation section 63 accumulates the value indicating the result of the comparison of the comparison section 62 at each timing. Then, the overpower determination section 64 determines overpower of a circuit in the target device, based on the result of the accumulation of the comparison result accumulation section 63.

As described above, in the overpower detection section according to the embodiment of the present invention, the result of comparison between the feature amount of the signal, for example, the magnitude of the envelope, and the evaluation threshold, is used, and thereby the average power is indirectly obtained without directly calculating the average power. For example, as alternative means for average power calculation, the rate at which the magnitude of the envelope exceeds the evaluation threshold PTh within a predetermined time period is used, and an overpower alarm is output based on this rate.

According to the above configuration, the average power of a signal associated with instantaneous variation can be obtained with a simple configuration. That is, overpower of a circuit that processes a signal associated with instantaneous variation can be detected with a simple configuration including, for example, a comparator and an up/down counter, without using a large number of flip-flops, memories, and the like.

Further, in the overpower detection section according to the embodiment of the present invention, the comparison result accumulation section 63 adds a positive or negative control value α to the most recent accumulation result in a case where the index value is larger than the evaluation threshold PTh, and adds a control value β with a sign opposite to that of the control value α to the most recent accumulation result in a case where the index value is smaller than the evaluation threshold PTh.

As described above, the control value α or the control value β is not set to 0, and the signs of the control value α and the control value β are made opposite to each other. Thereby, in a case where the power of the target signal, for example, the output level of the high power amplifier 85, is a normal value, the accumulation result of the comparison result accumulation section 63, for example, the count value of the up/down counter, can be caused to converge to a certain value. Thereby, a moving average of the power of the target signal can be obtained. That is, it becomes possible to detect overpower at the time when the minimum number of samples have been obtained after the power of the target signal exceeded the predetermined threshold.

Further, since the moving average can be obtained, it is possible to reduce the possibility of omission of overpower when the overpower period is short, as compared to the configuration in which the average power is calculated for each predetermined time period.

Further, it is possible to avoid the situation that the count value of the up/down counter is increased little by little due to an influence of noise or the like and thereby an overpower alarm is output erroneously. In addition, it is unnecessary to reset the count value of the up/down counter periodically or under a predetermined condition in order to avoid such erroneous detection, and thus the configuration can be simplified.

Now a case is considered where, in the comparison result accumulation section 63, the absolute value of the control value α to be added in a case where the magnitude of envelope is larger than the evaluation threshold PTh is set to be larger than the absolute value of the control value β to be added in a case where the magnitude of envelope is smaller than the evaluation threshold PTh. In this case, since increase in the cumulative value in the comparison result accumulation section 63 is quickened, overpower can be detected early, but on the other hand, the probability of erroneous detection is increased.

Conversely, a case is considered where the absolute value of the control value α is set to be smaller than the absolute value of the control value β. In this case, since increase in the cumulative value in the comparison result accumulation section 63 is slowed, the probability of erroneous detection is decreased, but on the other hand, overpower cannot be detected early.

In contrast to the above cases, in the overpower detection section according to the embodiment of the present invention, the absolute value of the control value α and the absolute value of the control value β are equal to each other.

According to this configuration, the earliness of overpower detection and the probability of erroneous detection can be successfully balanced.

Further, in the overpower detection section according to the embodiment of the present invention, the absolute value of the control value α and the absolute value of the control value β are 1.

According to this configuration, the comparison result accumulation section 63 can be implemented by a simple circuit that adds and subtracts 1, for example, an up/down counter.

Further, in the overpower detection section according to the embodiment of the present invention, the comparison result accumulation section 63 includes the up/down counter that performs count-up or count-down based on the magnitude correlation between the index value and the evaluation threshold PTh.

According to this configuration, the comparison result accumulation section 63 can be implemented by a versatile circuit, and thus the configuration can be simplified.

Further, in the overpower detection section according to the embodiment of the present invention, the evaluation threshold PTh is set to a value at which the count value of the up/down counter converges in a case where the power of the target signal is a value that causes no overpower, and the count value of the up/down counter increases or decreases from the convergence value in a case where the power of the target signal is a value that causes overpower.

According to this configuration, the moving average of the power of the target signal can be obtained with the simple configuration. In addition, in a case where the comparison result accumulation section 63 is, for example, an up/down counter, since the count value of the up/down counter converges to a certain value, for example, 0 when the power of the target signal is the normal value, the count value need not be reset, and thus the configuration can be simplified.

Further, in the overpower detection section according to the embodiment of the present invention, the overpower determination section 64 compares the accumulation result with the accumulation result threshold ATh, and determines overpower based on the magnitude correlation between the accumulation result and the accumulation result threshold ATh.

According to this configuration, it is possible to perform determination of overpower by the simple configuration using the threshold.

It is noted that, in the overpower detection section according to the embodiment of the present invention, the power information acquisition section 61 is configured to acquire the magnitude of the envelope of the I signal and the Q signal, i.e., $\sqrt{(I^2+Q^2)}$, but the present invention is not limited thereto. The power information acquisition section 61 may have any configuration as long as it acquires the index value of the power of the target signal at each timing. For example, the power information acquisition section 61 may be configured to acquire the power values of the I signal and the Q signal, i.e., $(I^2+Q^2)$, or may be configured to acquire a value obtained by performing a predetermined arithmetic operation on the amplitude value of the I signal and the amplitude value of the Q signal, i.e., $(I^2+Q^2)^n$.

Further, in the overpower detection section according to the embodiment of the present invention, the control value α is 1 and the control value β is −1 in the comparison result accumulation section 63, but the present invention is not limited thereto. The absolute values of the control value α and the control value β may be other than 1, the absolute values of the control value α and the control value β may be different from each other, the control value α or the control value β may be 0, or the control value α and the control value β may be of the same sign.

However, in a case where the control value a or the control value β is 0 and in a case where the control value α and the control value β are of the same sign, for example, the count value of the up/down counter needs to be reset periodically or under a predetermined condition.

Further, the overpower detection section according to the embodiment of the present invention is configured to detect overpower of a circuit in the radio communication device 201 in which the overpower detection section is included, but the present invention is not limited thereto. The overpower detection section 51 may be a separated device that detects overpower of another device. For example, the overpower detection section 51 may be configured to detect overpower of a radio communication device as the another device.

Further, the overpower detection section according to the embodiment of the present invention is configured to perform over output power detection, for example, to detect overpower of a circuit that amplifies a signal to be transmitted from the radio communication device 201, but the present invention is not limited thereto. The overpower detection section 51 may be configured to perform over input power detection, for example, to detect overpower of a circuit that amplifies a signal inputted from another device to the radio communication device 201. In this case, for example, a radio signal received by the radio communication device 201 is amplified by an amplifier, and the amplified signal is subjected to analog-to-digital conversion, and then the power information acquisition section 61 acquires the index value of power of the resultant signal at each timing.

Note that the embodiment disclosed is to be considered in all respects as illustrative and not restrictive. The scope of the invention is indicated by the appended claims rather than by the foregoing meaning, and all changes which come within the meaning and range of equivalency of the claims are therefore intended to be embraced therein.

DESCRIPTION OF THE REFERENCE CHARACTERS

- 51 overpower detection section
- 61 power information acquisition section
- 62 comparison section
- 63 comparison result accumulation section
- 64 overpower determination section
- 80 interface section
- 81 digital frequency conversion section
- 82, 83 digital/analog converter
- 84 quadrature modulation section
- 85 high power amplifier
- 101 remote radio head
- 102 body device
- 201 radio communication device

The invention claimed is:

1. An overpower detection device, comprising:
   a power information acquisition section for acquiring an index value of power, at each timing, of a signal transmitted or received in a target device;
   a comparison section for comparing the index value acquired by the power information acquisition section with an evaluation threshold;
   a comparison result accumulation section for accumulating a value indicating a comparison result of the comparison section at the each timing; and
   an overpower determination section for determining overpower of a circuit in the target device, based on an accumulation result of the comparison result accumulation section.

2. The overpower detection device according to claim 1, wherein
   the comparison result accumulation section adds a positive or negative first control value to the most recent accumulation result in a case where the index value is larger than the evaluation threshold, and adds a second control value with a sign opposite to that of the first control value to the most recent accumulation result in a case where the index value is smaller than the evaluation threshold.

3. The overpower detection device according to claim 2, wherein
   an absolute value of the first control value and an absolute value of the second control value are equal to each other.

4. The overpower detection device according to claim 3, wherein
   the absolute value of the first control value and the absolute value of the second control value are 1.

5. The overpower detection device according to claim 1, wherein
   the comparison result accumulation section includes an up/down counter that performs count-up or count-down based on the magnitude correlation between the index value and the evaluation threshold.

6. The overpower detection device according to claim 5, wherein
   the evaluation threshold is set to a value at which the count value of the up/down counter converges in a case where the power of the signal has a value that causes no overpower, and the count value of the up/down counter increases or decreases from the convergence value in a case where the power of the signal has a value that causes overpower.

7. The overpower detection device according to claim 1, wherein
   the overpower determination section compares the accumulation result with an accumulation result threshold, and determines overpower based on the magnitude correlation between the accumulation result and the accumulation result threshold.

8. A radio communication device, comprising:
   an amplifier for amplifying a radio signal to be transmitted or a radio signal received; and
   an overpower detection section for detecting over output power of the amplifier, wherein
   the overpower detection section comprises:
   a power information acquisition section for acquiring an index value of power, at each timing, of the signal before amplified by the amplifier or the signal after amplified by the amplifier;
   a comparison section for comparing the index value acquired by the power information acquisition section with an evaluation threshold;
   a comparison result accumulation section for accumulating a value indicating a comparison result of the comparison section at the each timing; and
   an overpower determination section for determining overpower in the amplifier, based on an accumulation result of the comparison result accumulation section.

* * * * *